Charles W. Willette
INVENTOR

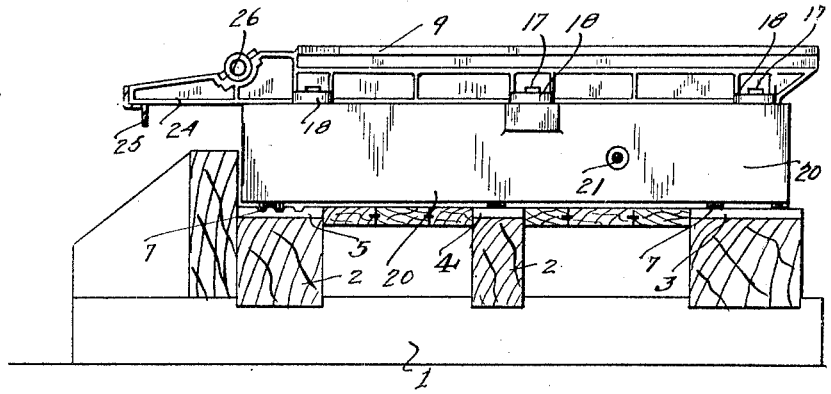
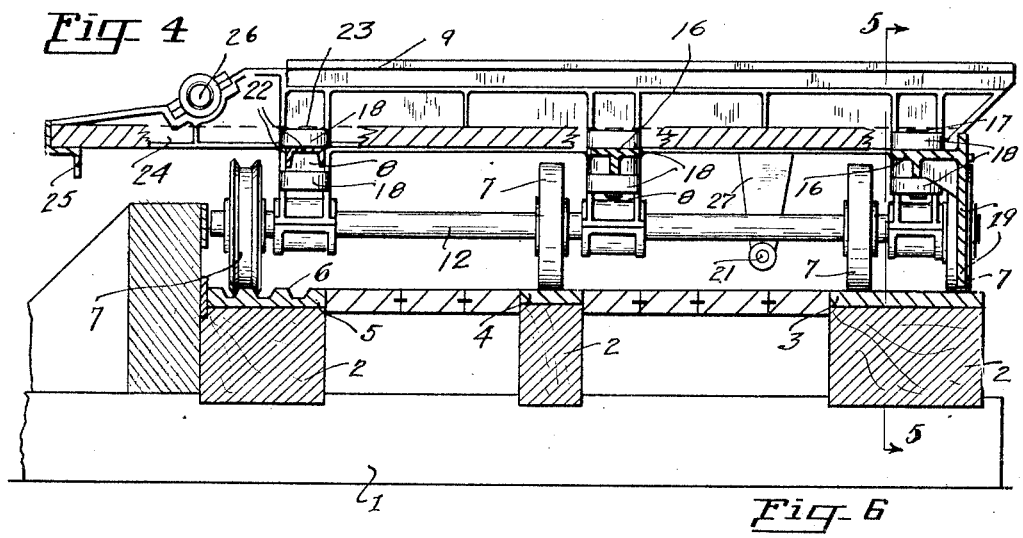
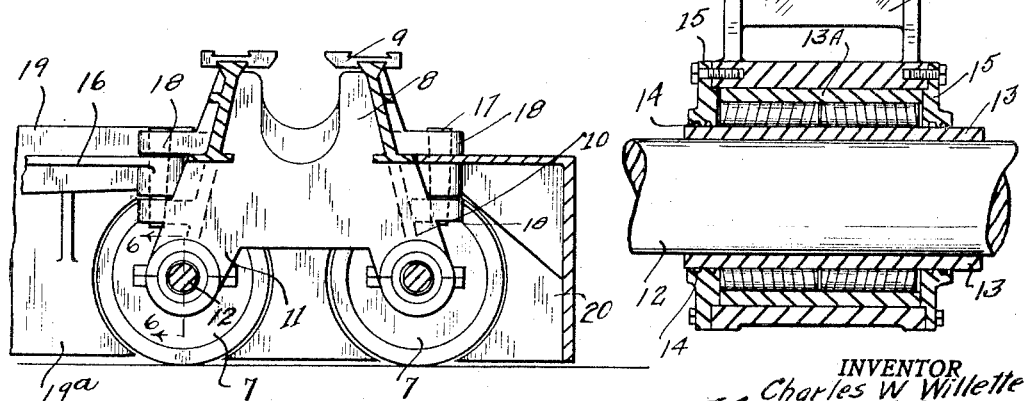

Patented Mar. 31, 1931

1,798,770

UNITED STATES PATENT OFFICE

CHARLES W. WILLETTE, OF PORTLAND, OREGON

LOG CARRIAGE

Application filed April 9, 1928. Serial No. 268,727.

Heretofore it has been the general custom in saw mills to fabricate the carriage of structural members, generally made of wood and to frabricate and make the carriage at the mill, it being common practice to periodically close the mill down and to repair or rebuild or renew the carriage partially or in its entirety, during such shut down. This is not only an expensive operation in money, but also consumes a substantial amount of time.

In my new and improved carriage it is intended to fabricate the same at a central location and to place the same in position in a mill and by the use of a few simple fastenings make, the same in readiness for use.

Also it has been the general custom to periodically stop the carriage and clean off from the carriageway or trackway the saw mill residue, as saw dust, chips, bark, slab elements and other foreign matter that becomes deposited upon the trackway during the sawing operation.

The primary purpose and object of my invention resides in a structural metal carriage adapted for manufacture at a centralized plant and for erection at the mill and one that could be operated over relatively long operating periods with a minimum of alteration and repair.
A further object of my invention resides in providing a plurality of tracks in spaced relationship upon which the carriage may be made to operate and that remain in alignment and in providing means within the carriage structure for maintaining the trackway in a relatively clean operating condition.

And still further objects of my invention reside in the fabricated structural metal frame, having a minimum of weight and yet made rigid in construction and that may be easily and quickly assembled when placed in position upon the track in a mill.

A still further object of my new and improved carriage resides in a construction and bearing support that would permit of a carriage operation at relatively high speeds with a minimum of operating frictional losses.

A further object of my new and improved carriage, consists in providing a plurality of supporting wheels and journal bearings therefor, that are made integral with the frame, thus maintaining the frictionless or roller bearings within the journals in precise alignment.

A further object of my new and improved carriage consists in providing an overhang for the set works that is also made integral with the frame elements.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 3 is an end view, taken on line 3—3 of Fig. 1, looking in the direction indicated.

Fig. 4 is a sectional, end view, taken on line 4—4 of Fig. 1, looking in the direction indicated.

Fig. 5 is a fragmentary, sectional, side elevation, taken on line 5—5 of Fig. 4, looking in the direction indicated.

Fig. 6 is a cross section view, of the journal bearing in preferred embodiment.

Like reference characters refer to like parts throughout the several views.

Figure 1:
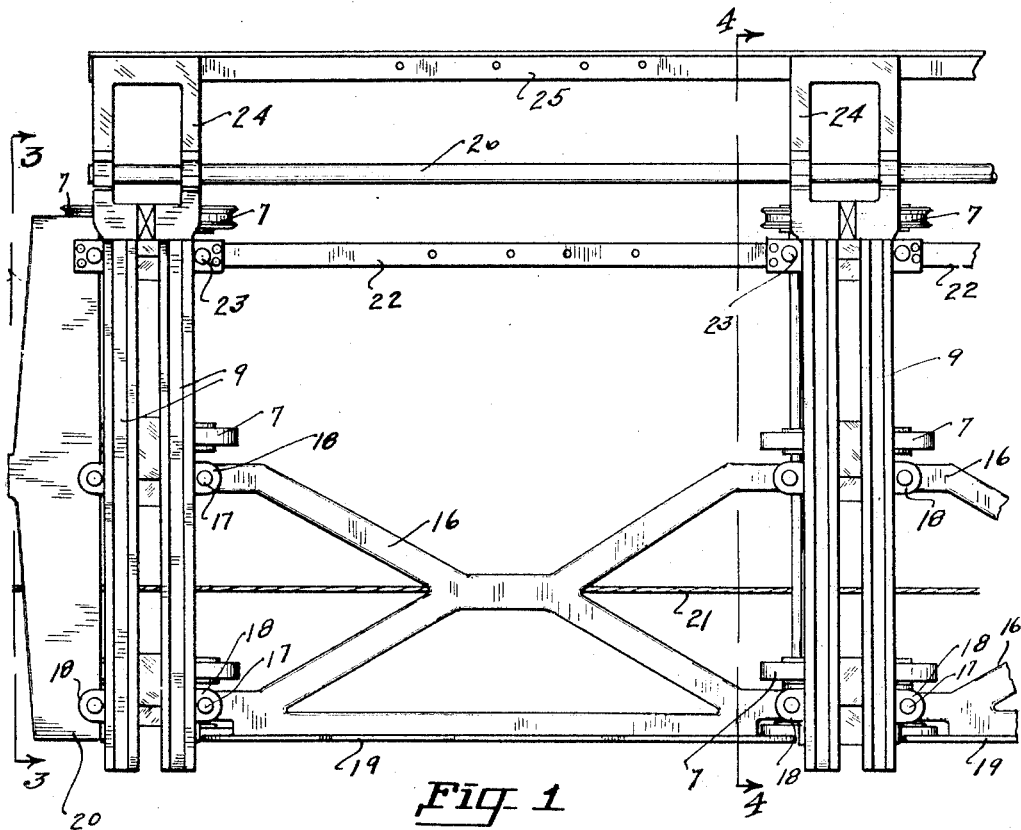
Fig. 1 is a fragmentary, top, plan view, of the carriage illustrating the same with the deck removed.
Figure 2:
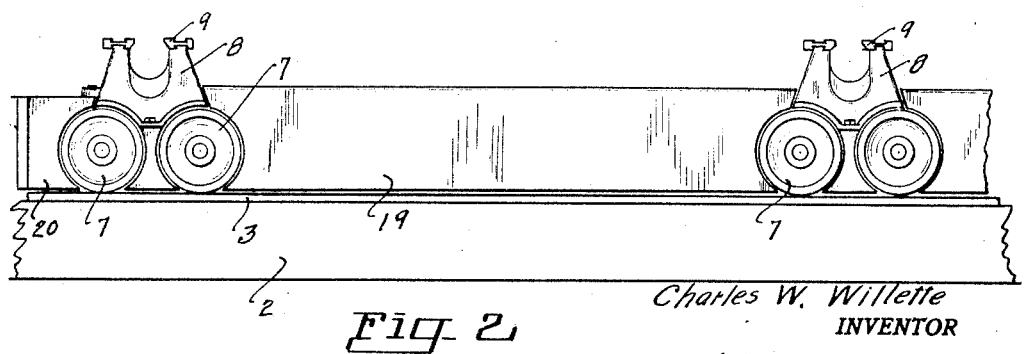
Fig. 2 is a side elevation of the mechanism, illustrated in Fig. 1.

I am aware that heretofore bearings have been made to coact with the truck axles on log carriages, where the same were babbitted or journaled in other ways, but under present conditions where high speeds are imparted to the carriages and where time becomes more valuable it is necessary to operate the mill over relatively long periods without the necessity of the shutting down of the mill. Under such operating conditions it is necessary to maintain the log carriage upon a relatively fixed track and to maintain the track in line for such operations. This form of construction necessitates the supporting of the carriage upon a larger number of wheels and to maintain the wheels upon axles that operate in frictionless bearings. The frictionless bearings are best maintained in line and in suitable working conditions where the bearing housings are placed within a one piece headblock element that may be made in a relatively one piece construction and that may be machined and bored as a one piece rigid element that will maintain in line and in true condition over a relatively long operating condition.

Saw mill carriages, especially where used on the larger logs are subjected to a tremendous amount of pounding and other abuses as the logs and cants are turned by the power machinery now in use and it is highly essential that the carriage be assembled and disassembled with the least amount of delay. In my new and improved carriage I form the same of a minimum number of rugged parts such as a one piece headblock element that is made of cast steel or other suitable material and secure the same together by connecting units that may be secured thereto with a minimum amount of time and mechanical effort. The entire carriage is assembled and tested at the point of origin of the same. Where carriages have been made of fabricated structural shapes the same become weakened and loose due to the pounding of the logs as turned and due to the tremendous strain that is placed upon the carriage as the same is shunted in its reciprocating movements past the saw. In my new and improved carriage the same is made relatively light due to the shape and a minimum number of fastenings are used due to the construction that I employ. I preferably use taper fastenings where possible that may be readily and quickly taken up when they become loose and which cannot become disconnected and dislodged from use.

I preferably form the sub-supporting elements of any suitable material, as a plurality of girders 1, having cross beams 2, arranged in spaced relationship and supported upon the girder 1. Metallic track elements 3, 4 and 5 are disposed upon the beams 2, and one of the track elements has a plurality of parallelly disposed upwardly extending tracks or guides 6, disposed within the surface upon which the supporting wheels 7, are made to engage. The set-out device engages one of the tracks to impart a lateral movement to the carriage when the same is impelled in the reverse direction.

My new and improved frame is made up of a plurality of headblock elements 8, terminating in dovetail guideways 9 at the top, and having a plurality of depending truck axle bearings 10 and 11, downwardly extending therefrom into which roller bearings, or other suitable frictionless bearings are disposed. The truck axles 12 upon which the wheels are mounted, have relatively long bearing sleeves 13, disposed thereupon upon which the frictionless or roller bearings are made to operate. The primary purpose and object of the long sleeves is to permit the off-set movement of the carriage frame relative to that of the supporting wheels which do not have an off-set movement. Felt lubricating retainers are placed within the grooves 14, of the end sections 15, of the journal bearings for maintaining the grease or other lubricant within the journal housing.

In preferred embodiment, I adapt two truck axle bearing sections and headblocks to support four wheels, two on each of the two first tracks, and the third truck axle bearing section and headblock to support four wheels on the last track, making in all eight wheels supported on three tracks disposed in parallel alignment. The headblocks are secured together by a structural cast or forged spreader-frame 16, which is secured to the headblock by any suitable fastening means, as through the use of taper pins 17, cooperating with the spreader-frame 16, and the lugs 18, disposed upon the headblock structure. A downwardly extending skirt 19, depends from the spreader frame 16 and is made to travel in slight spaced relationship with the track elements 3, 4, and 5. Disposed upon oppositely disposed ends of my assembled carriage, one of which is not shown in the drawings are bumper heads 20. These heads are removably secured to the headblocks by pins 17 and lugs 18 and also act to stiffen the total assembly. Each of the heads has downwardly extending skirts 19a the purpose of which is to maintain the trackway in normally free and clean condition from refuse and other saw mill waste that tends to collect upon track-way. These heads may be made to engage a cushioning stop to terminate the travel of the carriage at the end of each reciprocation and reduce the stop to a minimum shock. These skirts are made to engage just above the track elements 3, 4, and 5, so as to keep the tracks in a relatively clean operating condition as the skirts are swept back and forth longitudinally of the trackway. The feed rope 21, runs longitudinally of the carriage and is secured thereto by any suitable take-up fastening means, as a rope attaching bracket 27 made integral with and depending centrally from the spreader frame 16. A back rail 22, is secured to the headblocks by any suitable fastening means, as by taper pins 23, or by any other suitable fastening means, the purpose and object of which is to maintain the headblock elements of the carriage in a proper and suitable working relationship with the back rail. An overhang is provided at the rear of each headblock element, as illustrated at 24 in Fig. 4, and Fig. 1, and a Z bar 25 is connected to each of the overhanging elements to form a platform for supporting the set-works. The headblocks, truck bearings, the extension 24 and the Z bars are preferably made integral and of a single piece, thereby simplifying the construction and providing a more rigid and long lived construction. A set shaft 26 journaled within suitable bearings on the overhanging elements provides the operating power for manipulating the set-works.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:—

1. In a device of the class described, the combination in a log carriage, of roller bearing headblocks spaced apart by spreader frames and removably secured thereto by tapered pins and means for attaching the feed rope to the spreader frame.

2. In a log carriage, a spreader frame detachably securable to the headblocks to form a log carriage chassis comprising a plurality of arms extending from a central hub, said arms having openings at their terminal ends for permitting attachment of the spreader frame to the head blocks, a strut connecting two of said arms and forming a skirt adapted to keep refuse from the carriage tracks, and means depending from the hub of the frame for imparting reciprocation to the carriage in either a forward or backward direction.

CHARLES W. WILLETTE.